United States Patent [19]

Nemoto et al.

[11] 4,121,844
[45] Oct. 24, 1978

[54] BALL JOINT SEALS

[75] Inventors: Akira Nemoto; Yasunori Hamaguchi, both of Toyohashi; Kenichi Terai, Yokohama, all of Japan

[73] Assignees: Musashieimitsukogyo Kabushikikaisha, Toyohashi; Nippon Oil Seal Industry Co. Ltd., Tokyo, both of Japan

[21] Appl. No.: 824,328

[22] Filed: Aug. 12, 1977

[30] Foreign Application Priority Data

Oct. 15, 1976 [JP] Japan .................... 51-124151

[51] Int. Cl.² .............................. F16J 15/32
[52] U.S. Cl. ...................... 277/212 FB; 403/134; 74/18.1
[58] Field of Search ......... 277/DIG. 4, 212 R, 212 C, 277/212 F, 212 FB; 403/36, 35, 40, 134, 135, 140, 138, 288, 132, 133; 74/18.1, 18, 18.2

[56] References Cited

U.S. PATENT DOCUMENTS

| 3,175,834 | 3/1965 | Wallace et al. | 277/212 FB |
| 3,284,115 | 11/1966 | Schmidt | 277/212 FB X |
| 3,322,445 | 5/1967 | Hassan | 277/212 FB X |
| 3,901,518 | 8/1975 | Uchida | 403/134 X |

FOREIGN PATENT DOCUMENTS 1,006,462 10/1965 United Kingdom ............. 403/134

Primary Examiner—Robert S. Ward, Jr.
Attorney, Agent, or Firm—Armstrong, Nikaido, Marmelstein & Kubovcik

[57] ABSTRACT

Disclosed is an inverted cup-shaped cover of deformable material to be fitted over an open socket housing end of a pivotal ball joint assembly. The cover has a pair of opposite end openings, one of which is considerably smaller in diameter than the other and receives therethrough in sealed relationship the shank of a ball stud protruding from the housing through an open end thereof. The cover has a gently curved longitudinal sectional configuration and is flared toward its other end opening at which it is fitted over the open end of the housing. A ring is embedded in the flared portion of the cover and has an inner circumferential edge exposed toward the interior of the cover. This inner edge is sharp-angled and has a diameter slightly smaller than the maximum diameter of the housing at the open end thereof. This ring is formed of resilient material, for example, spring steel.

6 Claims, 6 Drawing Figures

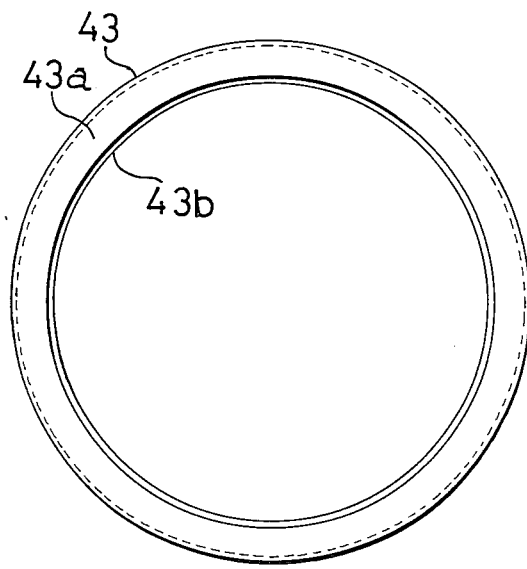
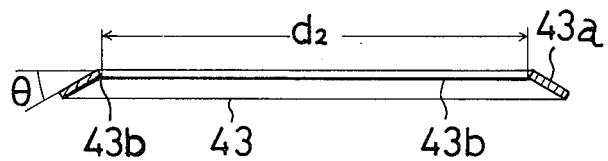
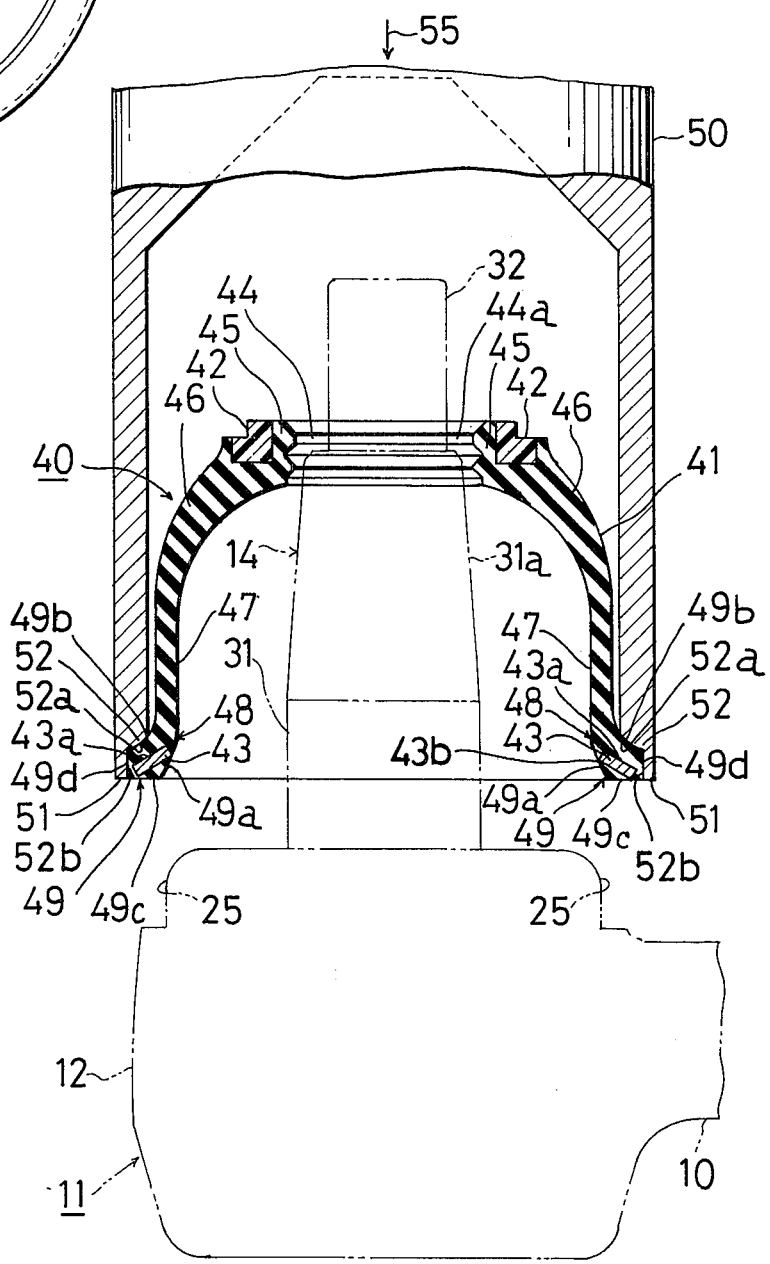

BALL JOINT SEALS

BACKGROUND OF THE INVENTION

1. Field of the Invention

This invention relates to dust sealing covers, or balloon or boot seals as commonly called, for pivotal ball joints for use in automotive steering linkages, wheel suspensions or other linkage systems.

2. Description of the Prior Art

The ball stud of a pivotal ball joint assembly is generally designed for full pivotal movement relative to a socket housing having an open end through which the ball stud protrudes. Accordingly, it is important that a dust sealing cover fitted over the open end of the housing for preventing the ingress of foreign matter, dust or the like into the interior of the ball joint be elastically deformable to adapt itself to the pivotal movement of the ball stud, and yet, can be securely held on the housing and the ball stud when it is deformed. In order to satisfy these requirements, it is ordinary practice to provide the dust sealing cover with a thin-walled middle portion, or form an annular groove on that portion of the housing on which the cover is fitted at one end thereof having a reduced diameter adapted for press fitting in the annular groove of the housing.

The dust sealing cover having such a thin-walled middle portion is effectively used on a ball joint employed for applications in which its ball stud is not very frequently liable to pivotal movement, because the thin-walled middle portion is elastically deformed in response to the pivotal movement of the ball stud. The dust sealing cover having its reduced diameter end press fitted in the annular groove on the housing can be maintained in a firmly secured position relative to the housing, and finds effective application in uses in which the time and labor required for fitting the cover do not present any substantial problem.

SUMMARY OF THE INVENTION

It is an object of this invention to provide a dust sealing cover which can be tightly fitted over the socket housing end of a pivotal ball joint assembly to ensure a tight seal against the entire periphery thereof, even if the peripheral surface of the housing end may be somewhat ovally distorted.

It is another object of this invention to provide a dust sealing cover which can be firmly maintained in place relative to the socket housing end of a pivotal ball joint assembly once installed, even if a considerable separating force is applied to the cover.

It is still another object of this invention to provide a dust sealing cover which can easily be fitted over the socket housing end of a pivotal ball joint assembly.

It is a further object of this invention to provide a dust sealing cover having a ring-embedded, flared end which can be tightly fitted over the socket housing end of a pivotal ball joint assembly through circumferentially uniform application of force onto the flared end by a fitting tool without causing distortion of the embedded ring to ensure a tight seal against the housing.

It is a further object of this invention to provide a dust sealing cover which can be maintained in close engagement with the socket housing end of a pivotal ball joint assembly to maintain a tight seal against the housing despite any heavy ball stud pivotal movement.

It is a further object of this invention to provide a dust sealing cover having a long life without any local concentration of bending fatigue due to repeated deformation during repeated ball stud pivotal movement.

Other objects and features of this invention will become apparent to those skilled in the art from the following detailed description and the accompanying drawings.

BRIEF DESCRIPTION OF THE DRAWINGS

FIG. 3 is a top plan view of a ring embedded in the dust sealing cover;

FIG. 4 is an axial sectional view of the ring shown in FIG. 3;

FIG. 5 is a front elevational view, partly omitted and in section, illustrating a method of fitting the dust sealing cover over the end of a socket housing.

DETAILED DESCRIPTION OF THE PREFERRED EMBODIMENT

Figure 1:
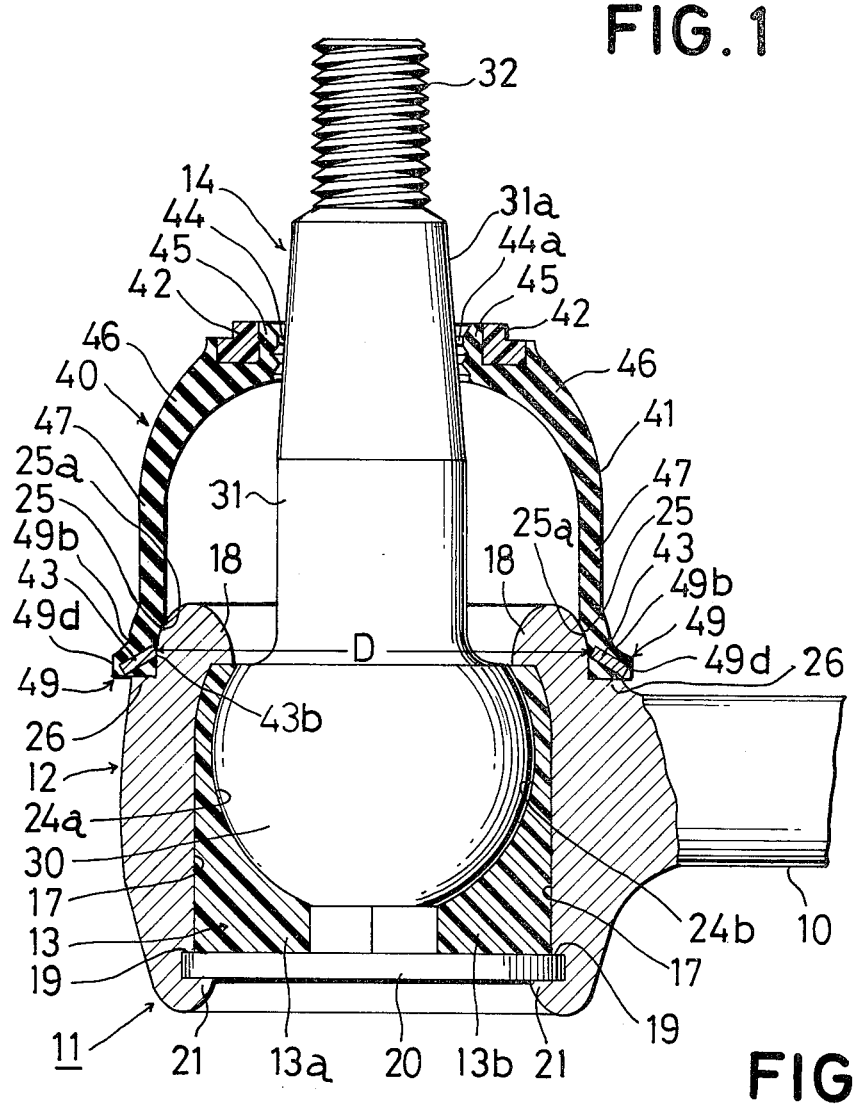
FIG. 1 is a front elevational view, partly in section, of a pivotal ball joint assembly having a dust sealing cover embodying this invention.

Referring now to FIG. 1 of the drawings more particularly, there is shown a pivotal ball joint assembly 11 connected to a tie rod end 10. The pivotal ball joint assembly 11 comprises a socket housing 12 integrally formed with the tie rod end 10 and having a pair of initially open opposite ends, a bearing member 13 enclosed in the socket housing 12, and a ball stud 14 supported on the bearing member 13 at one end. The housing 12 is formed by forging as a structure integrated with the tie rod end 10 and has an inner wall surface 17 finished to snugly receive the bearing member 13. The inner wall 17 is generally cylindrical and has a slightly upwardly tapered upper end as shown in FIG. 1. The housing 12 is formed at the upper end of its inner wall 17 with a radially inwardly extending annular shoulder 18 facing downwardly to retain the bearing member 13 within the housing 12. The housing 12 is formed with an annular groove 19 at the lower end of its inner wall 17. A circular plate 20 has a circumferential edge fitted in the groove 19 to close the housing 12 at its lower end. The plate 20 may be made of steel. The lower extremity of the housing 12 is provided with an upwardly facing annular inturned shoulder 21 which cooperates with the groove 19 in holding the circular plate 20. The upper and lower shoulders 18 and 21 may both be formed in a well known manner, whether swaging or otherwise.

The bearing member 13 has a generally cylindrical outer peripheral surface closely fitting the inner wall 17 of the housing 12, and a generally segmental spherical inner surface. The bearing member 13 has a pair of initially open opposite ends and is formed by a pair of bearing member sections 13a and 13b separable from each other in a vertical plane extending axially of the bearing member 13 as shown in FIG. 1. The bearing member sections 13a and 13b may be formed from porous synthetic resin, such as porous polyacetal or polyethylene. They have segmental spherical inner surfaces 24a and 24b, respectively. The ball stud 14 has a ball end 30 held between the inner surfaces 24a and 24b and preloaded by the bearing member sections 13a and 13b. It will be noted that the amount of preload imposed by the bearing member 13 upon the ball end 30 can be varied if the position of the annular groove 19 in the housing 12 is appropriately changed. For example, if the groove 19 is provided at a higher position than shown in FIG. 1, the plate 20 is raised accordingly to permit the bearing member 13 to be compressed against the inner wall 17 of the housing 12 with a stronger force. If the bearing member 13 is, thus, compressed by the plate 20 with a stronger force, the tapered upper end of the inner wall 17 permits the bearing member 13 to compress itself against the peripheral surface of the ball end 30 with a greater force.

The outer wall of the housing 12 is formed at its upper end with an upwardly facing annular shoulder 26 in the vicinity of the annular inturned shoulder 18 on the inner wall 17. The annular shoulder 26 on the outer wall defines a reduced diameter portion 25 around the upper extremity of the housing 12. A dust sealing cover 40 is fitted over the reduced diameter portion 25 as will hereinafter be described in further detail. The shoulder 26 is herein intended as a stop against the cover 40, but may be omitted if the portion 25 is otherwise appropriately formed.

The ball stud 14 includes a shank 31 and an externally threaded upper end 32. The ball end 30 is integrally formed with the lower end of the shank 31 and is rotatably supported in the bearing member 13, so that the ball stud 14 is capable of full pivotal movement relative to the housing 12. The shank 31 includes an upwardly tapered upper portion 31a having an upper end connected integrally with the lower extremity of the threaded end 32.

Figure 2:
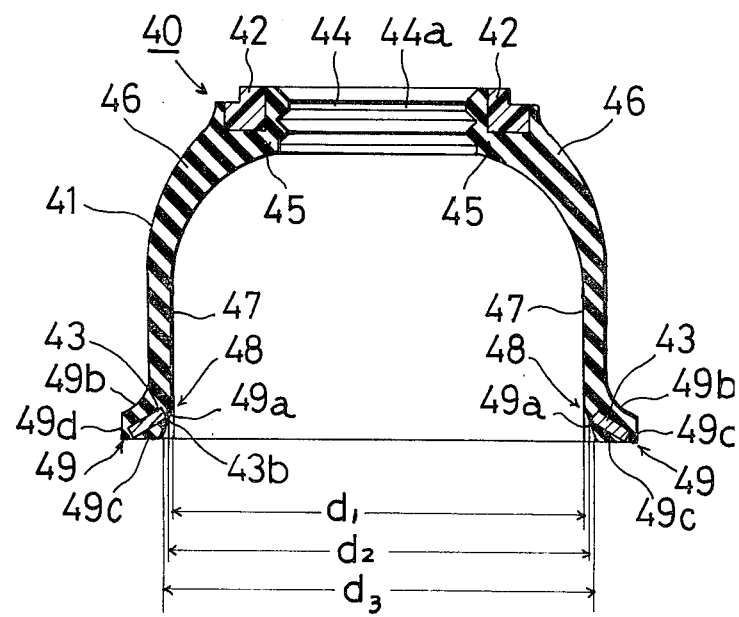
FIG. 2 is an axial sectional view of the dust sealing cover.

The dust sealing cover 40 comprises an inverted cup-shaped body 41, a reinforcing ring 42 provided around the upper end of the body 41 and a snap ring 43 provided around the lower end of the body 41 as shown in FIG. 2. The reinforcing and snap rings 42 and 43 may both be embedded in the material of the body 41 during the molding of the latter. The body 41 may be formed from synthetic rubber and is provided at its upper end with a circular opening 44 which is considerably smaller in diameter than a lower end opening. The body 41 includes an annular rim 45 encircling the opening 44 and a shoulder 46 radially outwardly extending from the rim 45. The shoulder 46 is curved downwardly to define a cylindrical wall portion 47 contiguously thereunder. The cylindrical wall portion 47 is radially outwardly bent at its lower end as indicated at 48 to define a flared portion 49 at the lower end of the body 41. The flared portion 49 has an inner peripheral surface 49a tapered toward the cylindrical wall portion 47. The rim 45 has an undulating inner peripheral surface formed with a plurality of elastically collapsible annular ridges 44a encircling the opening 44 and adapted for bringing the rim 45 into intimate contact with the outer surface of the shank 31 to effect a seal between the ball stud 14 and the cover 40.

The reinforcing ring 42 encircles the rim 45 and may be formed from nylon or like material. The ring 42 is rigid enough to prevent the rim 45 from being ovally warped due to pivotal movement of the ball stud 14 extending through the opening 44, or from being substantially displaced along the ball stud 14 during such ball stud movement. The snap ring 43 is embedded in the flared portion 49 in integral relationship therewith. This integrated assembly may be achieved by thermal bonding in a known manner to hold the snap ring 43 firmly in the flared portion 49. The snap ring 43 has an upper frustoconical surface 43a inclined at an angle $\theta$ to the horizontal as shown in FIG. 4. The snap ring 43 may be punched or stamped out from a rolled sheet of steel, particularly spring steel, in the form of a Belleville spring. The springiness of the snap ring 43 thus formed can be increased by heat treatment in an appropriate manner. The flared portion 49 has a generally frustoconical outer peripheral surface 49b tapered at an angle which is substantially equal to that at which the upper surface 43a of the snap ring 43 is tapered, as shown in FIG. 2. The snap ring 43 has an inner peripheral edge 43b which is evenly and smoothly finished. The flared portion 49 has an inner peripheral surface 49a which is initially slightly spread downwardly and radially outwardly as shown in FIG. 2. The inner edge 43b of the snap ring 43 is exposed in the inner surface 49a of the flared portion 49 without projecting inwardly therefrom. The inner edge 43b of the snap ring 43 has a diameter $d_2$ which is smaller than the outside diameter D of the reduced diameter portion 25 of the housing 12. The outwardly curved portion 48 of the cover body 41 has a minimum inside diameter $d_1$ which is smaller than the diameter $d_2$ of the inner edge 43b of the snap ring 43 as illustrated in FIG. 2. The flared portion 49 has a lower end 49c abutting on the outer shoulder 26 of the housing 12 as shown in FIG. 1. At its lower end 49c, the flared portion 49 has an inside diameter $d_3$ which is larger than the outside diameter D of the reduced diameter portion 25 of the housing 12. The flared portion 49 includes a generally cylindrical outer peripheral surface 49d extending between its frustoconical surface 49b and lower end 49c and defining the maximum outside diameter of the flared portion 49 and hence, of the cover body 41.

In assembling the ball stud 14 in the socket housing 12, the ball end 30 of the ball stud 14 is first placed between the two sections 13a and 13b of the bearing member 13. With the bearing member 13 snugly engaged about the ball end 30, the ball stud 14 and the bearing member 13 are fitted into the housing 12 by first inserting the threaded end 32 through the lower end of the housing 12 which is initially open prior to placement of the closure plate 20. With the bearing member 13 holding the ball end 30 thus press-fitted in the housing 12, the plate 20 is placed into engagement with the annular groove 19 of the housing 12 and the annular shoulder 21 is rolled in to underlie the peripheral edge of the plate 20, whereby the ball stud 14 is rotatably mounted in the housing 12 with its shank 31 and thread end 32 protruding outwardly through the upper end of the housing 12 as schematically shown in broken lines in FIG. 5.

A press-fit device, such as shown at 50 in FIG. 5, is used to fit the dust sealing cover 40 on the socket housing 12. The press-fit device 50 comprises a cylinder of steel or any other suitable metal. The device 50 is partly hollow and open at one end 51. The hollow part of the cylinder is radially outwardly recessed to define an annular shoulder 52 in the vicinity of its open end 51. The annular shoulder 52 provides a frustoconical surface 52a which is tapered at an angle substantially equal to that of the taper of the upper surface 43a of the snap ring 43 and the frustoconical surface 49b of the flared portion 49. Thus, frustoconical surface 52a of the device 50 snugly fits the frustoconical surface 49b of the flared portion 49 when the dust sealing cover 40 is fully inserted into the device 50. The annular shoulder 52 defines a reduced wall thickness portion 52b contiguous to the frustoconical surface 52a. The reduced wall thickness portion 52b has an inside diameter which is substantially equal to the diameter of the radially outermost cylindrical surface 49d of the flared portion 49, so that the device 50 can hold the flared portion 49 snugly to position the cover 40 correctly. The device 50 is adapted to be carried by a punch on a press not shown.

In order to fit the cover 40 on the housing 12, the press-fit device 50 is secured to a press of appropriate type and the cover 40 is inserted into the device 50 as shown in FIG. 5 and described above. The assembly of the housing 12, the bearing member 13 and the ball stud 14 is fixedly supported under the device 50 in such a manner that the ball stud 14 extends through the upper end opening 44 of the cover 40 and that the reduced diameter portion 25 of the housing 12 is axially aligned with the cover 40, as illustrated in FIG. 5. Then, the device 50 is lowered as indicated by an arrow 55 to place the lower end of the cover 40 into abutment on the reduced diameter portion 25 of the housing 12. After the coaxial relationship between the housing 12 and the cover 40 is ascertained, pressure is applied to the device 50 downwardly in the direction of the arrow 55 to further lower it to thereby press-fit the flared portion 49 of the cover 40 over the reduced diameter portion 25 of the housing 12 as shown in FIG. 1. It will be understood that it is also possible to place the cover 40 in abutment on the housing 12 and then fit the device 50 over the cover 40 to force the cover 40 down over the reduced diameter portion 25 of the housing 12.

The reduced diameter portion 25 of the housing 12 has an upper end 25a which is beveled or rounded as shown in FIG. 1. The inner surface 49a of the flared portion 49 is downwardly spread and the inside diameter $d_3$ of the flared portion 49 at its lower end 49c is larger than the maximum outside diameter D of the reduced diameter portion 25 as mentioned before. Therefore, the upper end of the reduced diameter portion 25 does not interfere with the lower end of the flared portion 49, but the flared portion 49 is protected against any undesirable deformation, during its insertion over the reduced diameter portion 25. In other words, the absence of any excess material on the inner surface 49a of the flared portion 49 contributes to protecting the snap ring 43 against undesirable distortion.

Substantial pressure can safely be applied by the device 50 onto the flared portion 49 of the cover 40 without deforming the snap ring 43 in an undesirable fashion, as the pressure is uniformly distributed over the entire area of the upper surface 43a of the snap ring 43. This is because the frustoconical surface 52a of the device 50 has a degree of taper substantially equal to those of taper of the frustoconical outer surface 49b of the flared portion 49 and the upper surface 43a of the snap ring 43 as explained before.

When the cover 40 is fitted over the reduced diameter portion 25, the flared portion 49 is expanded by the reduced diameter portion 25 radially outwardly to a certain extent to permit the inner edge 43b of the snap ring 43 to be tightly engaged against the reduced diameter portion 25 along its entire circumference. The inner edge 43b of the snap ring 43 is preferably formed with a relatively sharp angle smaller than 90°, so that by virtue of its elasticity, the snap ring 43 is brought into intimate contact with the outer surface of the reduced diameter portion 25 along the entire circumference of the latter, even if the reduced diameter portion 25 may have a somewhat ovally distorted outer peripheral surface. Moreover, since the minimum inside diameter $d_1$ of the flared portion 49 is smaller than both the outside diameter D of the reduced diameter portion 25 and the diameter $d_2$ of the inner edge 43b of the snap ring 43 as noted before, the flared portion 49 has an extensive area of intimate contact with the reduced diameter portion 25 when the cover 40 is fitted over the housing 12, whereby the cover 40 provides an excellent fluid-tight seal for the pivotal ball joint assembly 11.

In its final assembled relationship with the housing 12, the dust sealing cover 40 may be filled with lubricant in a well known manner.

Figure 6:
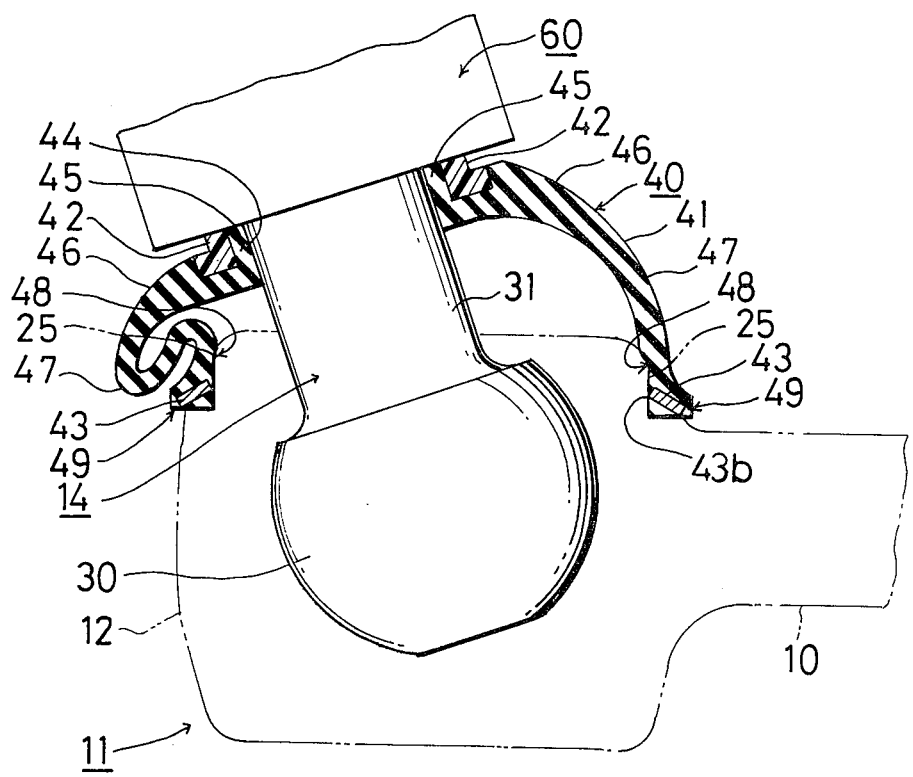
FIG. 6 is a schematic front elevational view, partly in section, of the pivotal ball joint assembly in use, showing its dust sealing cover in a deformed position.

The pivotal ball joint assembly 11 thus assembled may, for example, be used with an automotive steering linkage, such as schematically shown at 60 in FIG. 6. Referring to FIG. 6, the linkage 60 is connected with the threaded end 32 of the ball stud 14 and inserted over the shank 31 thereof. The linkage 60 compresses the cover 40 toward the ball end 30 and draws the rim 45 into wedge fit with the shank 31, whereby the pivotal ball joint assembly 11 is effectively sealed against the ingress of dust, water or any other foreign material.

In operation, the ball stud 14 may, for example, be rotated relative to the housing 12 and the tie rod end 10 as shown in FIG. 6. The reinforcing ring 42 ensures that intimate, fluid-tight contact be maintained between the rim 45 and the shank 31 without any distortion of the upper end opening 44 of the cover 40. Likewise, the snap ring 43 maintains the flared portion 49 of the cover 40 in its sealing connection with the reduced diameter portion 25 of the housing 12. Accordingly, the cover 40 undergoes elastic deformation in its shoulder 46, cylindrical wall portion 47 and outwardly bent portion 48 to adapt itself to the pivotal movement of the ball stud 14. As shown in the drawings, however, the cover 40 presents a gently curved wall configuration extending between the rim 45 and the flared portion 49 and has a substantially uniform wall thickness throughout. Therefore, pivotal movement of the ball stud 14 always causes deformation of the cover 40 as a whole, rather than localized sharp-angled bending of its cylindrical wall portion 47. Thus, the cover 40 is never liable to any excessive bending fatigue concentrated on any particular portion thereof, but provides a prolonged service life by virtue of its uniformly scattered fatigue distribution.

While the invention has been described with reference to a preferred embodiment thereof, it is to be understood that modifications or variations may be easily made by those skilled in the art without departing from the spirit and scope of this invention as defined in the appended claims.

What is claimed is:

1. A dust sealing cover for a pivotal ball joint assembly including a housing having an open end and a ball stud extending outwardly from said housing through said open end thereof, said cover comprising:
   an inverted cup-shaped body formed of elastic material and having a pair of opposite marginal portions each defining an opening, said opening of one of said marginal portions being smaller in diameter than that of the other marginal portion and adapted to receive said ball stud therethrough, said other marginal portion being flared to be fitted over said open end of said housing, said body including an intermediate portion extending between said smaller opening and said flared portion; and
   a ring having inner and outer circumferential edge portions, said inner edge portion including a continuously centrally inclined face forming a sharp-cornered innermost circumferential edge, said innermost circumferential edge having a continuous circumference of constant diameter lying in a plane vertically spaced from said outer edge portion, and having a diameter slightly smaller than the maximum diameter of said housing at said open end thereof, said ring, including said sharp-cornered innermost circumferential edge, being embedded in said flared portion, the gripping force of said ring through said flared portion against said housing being entirely through said sharp-cornered innermost circumferential edge.

2. A dust sealing cover as defined in claim 1, wherein said ring is formed in the shape of a Belleville spring and has an inner peripheral surface directed toward said opening of said other marginal portion.

3. A dust sealing cover as defined in claim 1, wherein said flared portion has an inner peripheral surface which is radially outwardly spread toward said opening of said other marginal portion, said last mentioned opening having a diameter which is larger than said maximum diameter of said housing at said open end thereof.

4. A dust sealing cover as defined in claim 2, wherein said flared portion has a radially outwardly spread outer peripheral surface, and said ring has an outer peripheral surface which is parallel to said outer peripheral surface of said flared portion.

5. A dust sealing cover as defined in claim 1, wherein said flared portion has an inner peripheral surface which is radially outwardly spread toward said opening of said other marginal portion, and wherein axially inwardly of said inner edge of said ring, said flared portion has an inside diameter which is smaller than said maximum diameter of said housing at said open end thereof.

6. A dust sealing cover as defined in claim 1, wherein said intermediate portion is formed with a gently curved longitudinal sectional configuration.

* * * * *

UNITED STATES PATENT AND TRADEMARK OFFICE
CERTIFICATE OF CORRECTION

PATENT NO. : 4,121,844
DATED : October 24, 1978
INVENTOR(S) : Akira Nemoto; Yasumori Hamaguchi It is certified that error appears in the above-identified patent and that said Letters Patent are hereby corrected as shown below:

On title page,

Column 1, [73] change "Assignees:Musashieimitsukogyo Kabushikaisha, Toyohashi; Nippon Oil Seal Industry Co. Ltd., Tokyo, both of Japan" to --Assignees : Musashiseimitsukogyo Kabushikikaisha, Toyohashi; Nippon Oil Seal Industry Co. Ltd., Tokyo, both of Japan--.

Signed and Sealed this

Thirteenth Day of March 1979

[SEAL]

Attest:

RUTH C. MASON
*Attesting Officer*

DONALD W. BANNER
*Commissioner of Patents and Trademarks*